(12) United States Patent
Dodge

(10) Patent No.: US 6,238,113 B1
(45) Date of Patent: May 29, 2001

(54) MEDIA FEED APPARATUS FOR IMAGING SYSTEM

(75) Inventor: Dennis W. Dodge, Amherst, NH (US)

(73) Assignee: Agfa Corporation, Wilmington, MA (US)

(*) Notice: Subject to any disclaimer, the term of this patent is extended or adjusted under 35 U.S.C. 154(b) by 0 days.

(21) Appl. No.: 09/408,782

(22) Filed: Sep. 30, 1999

(51) Int. Cl.⁷ .................................................. B41J 11/26
(52) U.S. Cl. .................... 400/613; 400/614; 400/617; 347/104
(58) Field of Search ..................... 347/139, 153, 347/164, 262, 264, 222, 104; 400/611, 613, 613.1, 613.2, 613.3, 612.6, 614, 614.1, 617, 619, 620, 621, 118.2

(56) References Cited

U.S. PATENT DOCUMENTS

| | | | |
|---|---|---|---|
| 4,205,323 | * 5/1980 | Williams et al. | 347/164 |
| 4,480,933 | * 11/1984 | Shibayama et al. | 400/619 |
| 4,560,990 | * 12/1985 | Sue et al. | 400/621 |
| 4,707,712 | * 11/1987 | Buckley et al. | 347/104 |
| 5,671,005 | * 9/1997 | McNay et al. | 347/264 |
| 5,867,199 | * 2/1999 | Knox et al. | 347/139 |
| 5,988,903 | * 11/1999 | Baitz et al. | 347/104 |
| 6,168,270 | * 1/2001 | Saikawa et al. | 347/104 |

FOREIGN PATENT DOCUMENTS

| | | | |
|---|---|---|---|
| 2477074 | * 9/1981 | (FR) | 400/621 |
| 0257270 | * 12/1985 | (JP) | 400/617 |
| 0205165 | * 9/1986 | (JP) | 400/619 |

* cited by examiner

*Primary Examiner*—Eugene Eickholt
(74) *Attorney, Agent, or Firm*—William E. Hilton; Robert A. Sabourin

(57) ABSTRACT

A media supply cassette is disclosed for use in an imaging system for processing a web of imageable media. The media supply cassette includes a first roller and a second roller for providing a nip through which the media exits the supply cassette through rotation of the first roller. The supply cassette also includes a third roller coupled to the first roller such that rotation of the third roller causes the first roller to rotate. The third roller is positioned to contact a fourth roller in the imaging system such that rotation of the fourth roller causes the third roller to rotate thereby providing rotation of the first roller which causes the media to exit the cassette and enter the imaging system.

10 Claims, 4 Drawing Sheets

MEDIA FEED APPARATUS FOR IMAGING SYSTEM

BACKGROUND OF THE INVENTION

The invention relates to the field of imaging systems, and particularly relates to imaging systems in which a continuous web of media is fed through an imaging apparatus.

Imaging systems that feed recording media through an imaging apparatus may include a movable optical carriage that displaces a beam of light from an imaging source, such as a laser. The carriage moves in a direction transverse to the direction of movement of the web in a slow scan to expose a supply of recording media to the light beam. Such a carriage for use in an imaging system including an internal imaging drum for supporting the recording media, is disclosed for example in U.S. Pat. No. 5,598,739, the disclosure of which is hereby incorporated by reference.

As shown in FIG. 1, in a conventional imaging system 10 including an imaging drum 12, a web of image recording media 14 travels from a supply cassette 16 around the inner support surface 18 of the drum 12 to a take up cassette 20. The media generally has sufficient inherent stiffness that it maintains the cylindrical shape of the inner surface 18 of the drum 12 when coupled to cassettes 16 and 20. A movable carriage 22 may be used to position a beam of laser light 24 on desired portions of the recording surface 26 of the media 14. The imaging system 10 is typically coupled to a computer controlled image processor (not shown). The media is typically driven through the system by drive rollers 28 and 30.

Each cassette 16 and 20 is typically sealed from light as appropriate, and each provides an elongated opening through which the web of media may pass as it exits the supply cassette 16 and enters the take up cassette 20. The cassettes may be loaded into the system via access openings and/or by removing a top cover. A portion of the media extending from supply cassette must be fed between the drive rollers 28 so that it may be drawn from the supply cassette and fed through the imaging system. One of the rollers 28 may be separable from the other roller to facilitate the introduction of the media therebetween. This leading portion is necessarily exposed to light during conventional operation of the imaging system.

It is desirable that the media be fed between the drive rollers in optimal alignment with the imaging region. If the leading portion of the media is shifted to one side or the other as it enters the nip between the rollers 28 (or as the rollers 28 come together to sandwich the media), then the media will not be aligned. Also, if one side edge of the media is fed in advance of the opposing other side edge, then the media will not be aligned with the imaging region. Precise alignment of the photosensitive media is critical, as entire multicolor printing operations of very high resolution depend on the proper orientation of the imageable media within the imaging region. Potential problems exist where the media must be fed by hand between the drive rollers, particularly when the leading edge of the web of media is not cut squarely, and/or when buckles are formed in the media between the supply cassette and the drive rollers.

It is desirable to provide a media supply system that is accurate and relatively easy to use, yet involves relative little mechanical complexity. It is further desirable to provide a media supply system that is relatively economical to produce.

SUMMARY OF THE INVENTION

The invention provides media supply cassette for use in an imaging system for processing a web of imageable media. The media supply cassette includes a first roller and a second roller for providing a nip through which the media exits the supply cassette through rotation of the first roller. The supply cassette also includes a third roller coupled to the first roller such that rotation of the third roller causes the first roller to rotate. The third roller is positioned to contact a fourth roller in the imaging system such that rotation of the fourth roller causes the third roller to rotate thereby providing rotation of the first roller which causes the media to exit the cassette and enter the imaging system. A predetermined amount of film will extend outside the supply cassette nips, minimizing the amount of film media that is wasted during loading. In an embodiment, the nip drives in the imaging system assist in rewinding film into the supply cassette.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
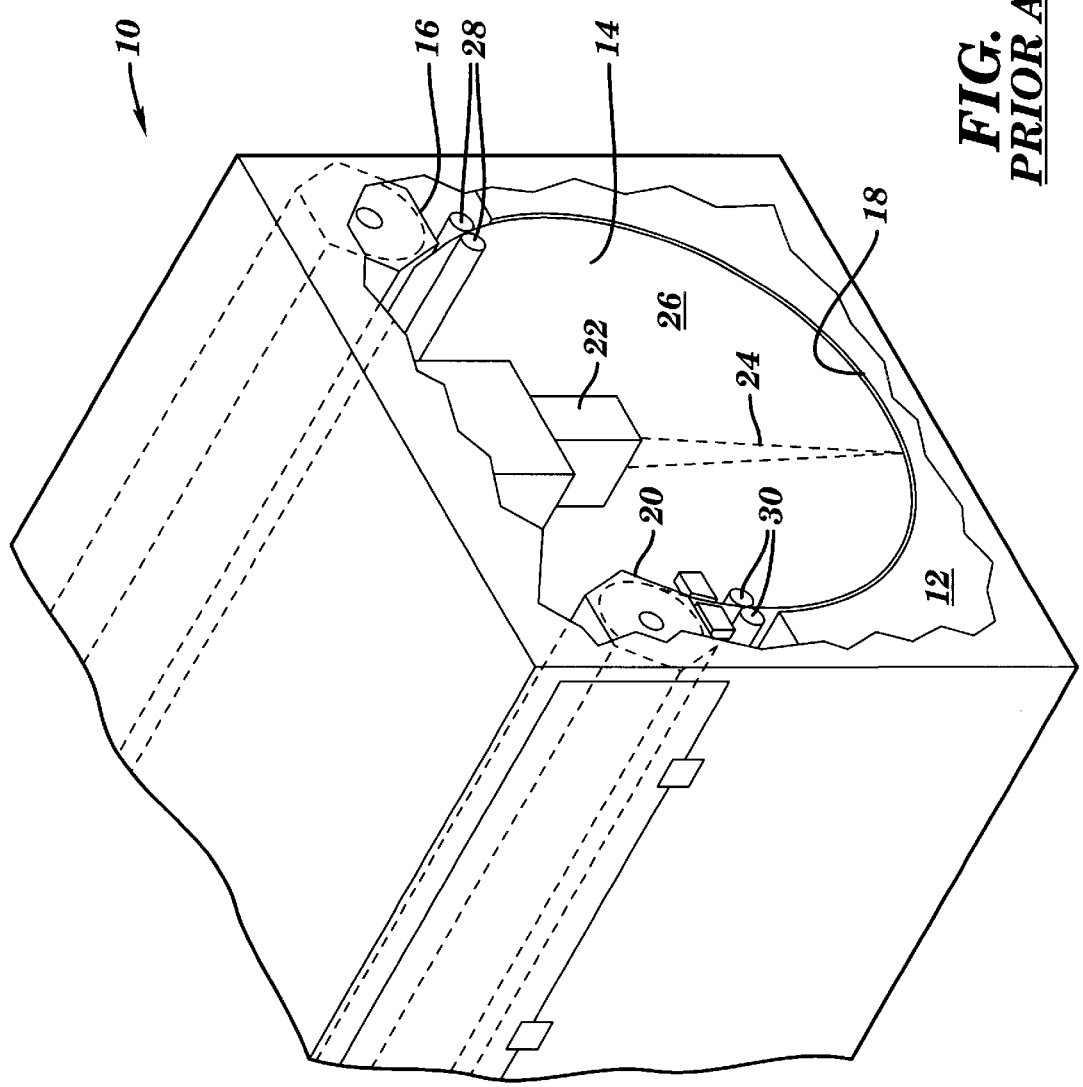
FIG. 1 shows an illustrative view of a portion of a conventional imaging system.
Figure 2:
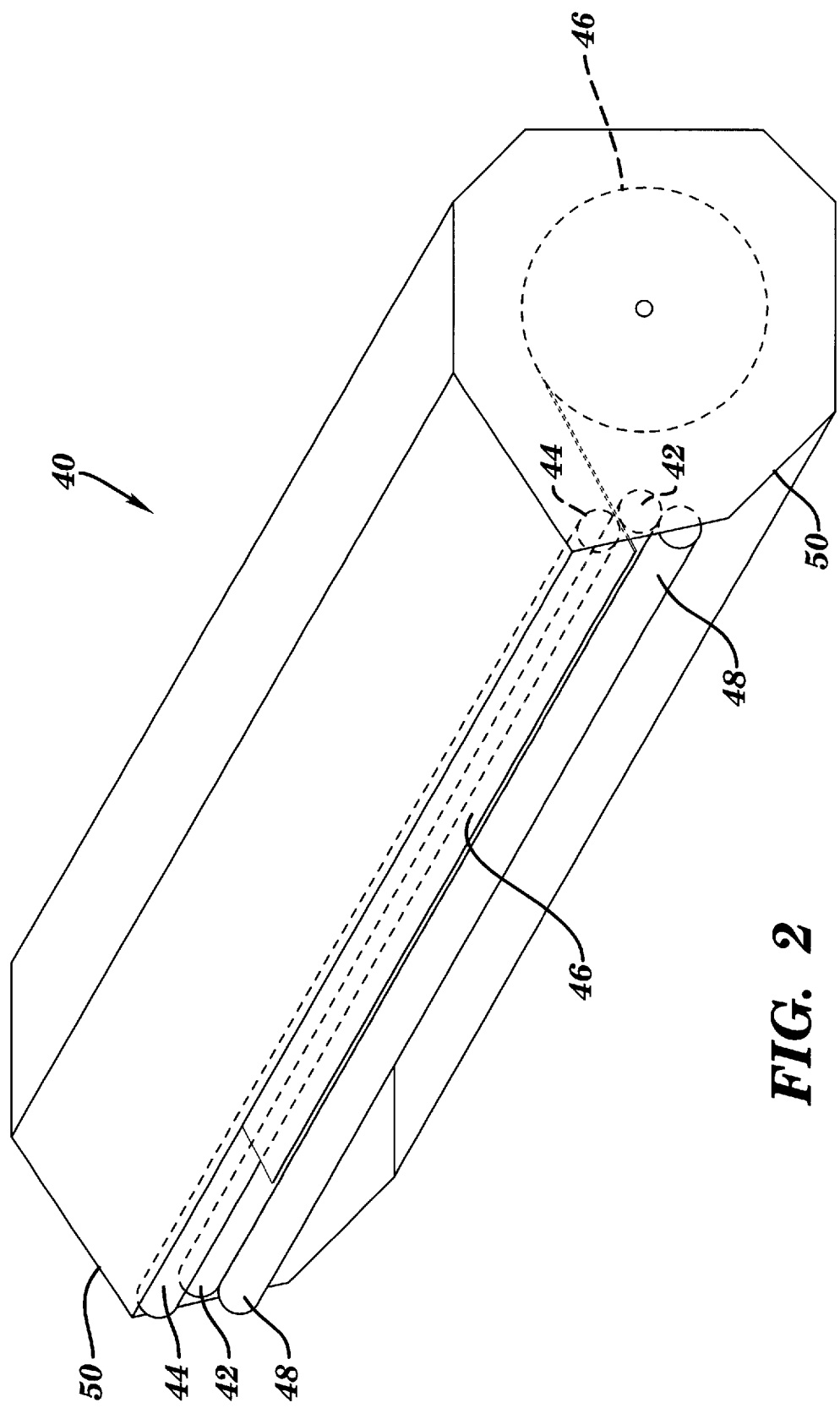
FIG. 2 shows an illustrative view of a media supply cassette in accordance with an embodiment of the invention.

As shown in FIG. 2, a media supply cassette 40 of an embodiment of the invention includes a pair of rollers 42 and 44 between which one end of a web of media 46 extends from the cassette 40. As one (or both) of the rollers 42, 44 rotates, the web of media 46 is drawn from (or forced into if driven in reverse) the cassette 40. The web of imageable media 46 resides within the cassette in a roll as shown. The media may be provided in width as desired for the imaging application, and further may be centered or one side justified as required.

Figure 3:
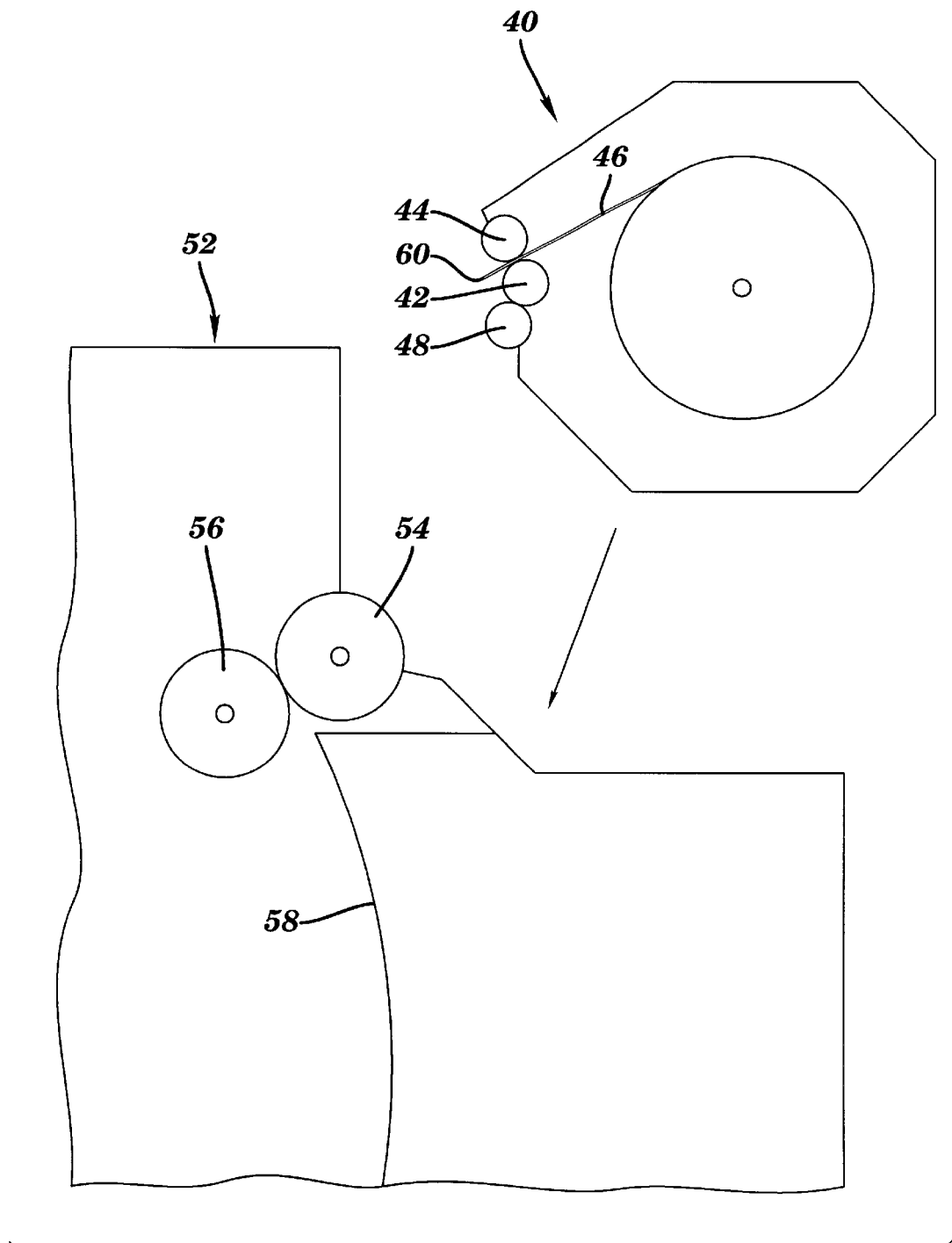
FIG. 3 shows an illustrative side view of the media supply cassette shown in FIG. 2 prior to loading into an imaging system.
Figure 4:
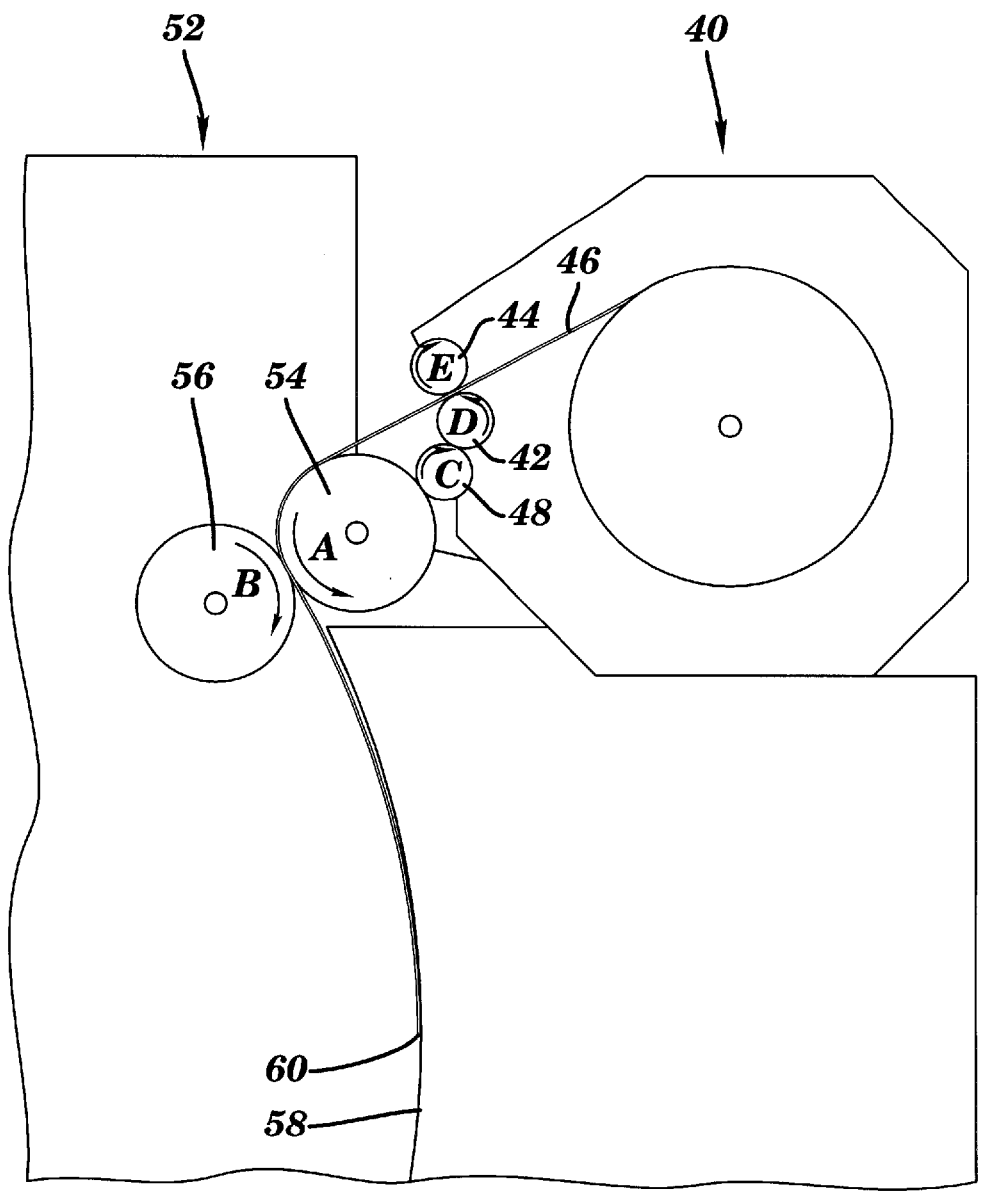
FIG. 4 shows an illustrative side view of the media supply cassette shown in FIG. 3 with the imageable media loaded into the imaging system.

The cassette 40 also includes a contact roller 48, one side of which extends slightly beyond the edge of the housing 50 of the cassette 40. As shown in FIGS. 3 and 4, when the cassette 40 is loaded into an imaging system 52, the contact roller 48 contacts one of a drive roller 54 within the imaging system 52. The drive roller 54, together with another (drive or follower) roller 56 form a nip through which media may be fed into a drum 58 of the imaging system 52.

The cassette 40 is assembled such that the leading edge 60 of the media 46 extends from between the rollers 42 and 44 only a short distance. During use, the cassette 40 is positioned into the imaging system 50 as shown in FIG. 4. After the cassette 40 is inserted into the imaging system, the drive roller 54 is actuated and rotates in a direction generally indicated at A in FIG. 4. This causes the roller 56 rotate in the opposite direction as indicated at B in FIG. 4. Since the contact roller 48 abuts the drive roller 54, the contact roller 48 will also rotate due to the rotation of the drive roller 54. The contact roller 48 will rotate in the direction indicated at C in FIG. 4, which in turn will cause the roller 42 to rotate in the direction indicated at D. The follower roller 44 will rotate in the direction indicated at E.

The leading edge of the media 46 will be driven from the cassette 40 and will contact the outer surface of the drive roller 54. The drive roller 54 is preferably formed of a material that will urge the media 46 to remain in contact with the roller 54 once the media 46 contacts the roller 54. In alternative embodiments, the media may be fed directly toward the nip formed by the rollers 54 and 56 (e.g., from above the rollers 54, 56 when arranged horizontally).

The rollers 42, 44, 48, 54 and 56 may be coated with any friction promoting material. For example, in an embodiment the drive rollers 54 and 56 are coated with an elastomeric material, roller 48 is an uncoated metal roller, and rollers 42 and 44 are coated with an elastomeric material. The friction drive between the surfaces of the rollers 54, 48 and 42 ensures that the surface speed at the nip pairs (54,56) and (42,44) are equal, thereby ensuring common film speed in the system.

Those skilled in the art will appreciate that numerous modifications and variations may be made to the above disclosed embodiments without departing from the spirit and scope of the present invention.

What is claimed is:

1. A media supply cassette for use in an imaging system for processing a web of imageable media, said media supply cassette comprising:

a first roller and a second roller for providing a nip through which the media exits said supply cassette, and wherein rotation of said first roller causes the media to exit said supply cassette; and a third roller coupled to said first roller such that rotation of said third roller causes said first roller to rotate, wherein said third roller is positioned to contact a fourth roller in said imaging system such that rotation of the fourth roller causes said third roller to rotate thereby providing rotation of said first roller which causes the media to exit said cassette and enter the imaging system.

2. A media supply cassette as claimed in claim 1, wherein said media supply cassette provides automated loading of said media into the imaging system.

3. A media supply cassette as claimed in claim 1, wherein said first roller is coated with an elastomeric material.

4. A media supply cassette as claimed in claim 1, wherein said second roller is coated with an elastomeric material.

5. A media supply cassette as claimed in claim 1, wherein said imaging system further includes a fifth roller for coacting with said fourth roller to provide a nip through which said media is fed into an imaging region of the imaging system.

6. A media supply cassette as claimed in claim 5, wherein said imaging region includes a drum surface.

7. A media supply cassette as claimed in claim 1, wherein said fourth roller includes a surface that provides sufficient attraction to said media that the leading edge of the media remains in contact with said fourth roller once said media and the fourth roller contact one another.

8. An imaging system for processing a web of imageable media, said imaging system comprising:

draw means for drawing imageable media from within a media supply cassette;

drive means for feeding the media into an imaging region of said imaging system; and coupling means in communication with said draw means and said drive means for providing that movement of said drive means causes movement of said draw means such that media may be drawn from within said cassette and into said imaging region via actuation of said drive means prior to said media contacting said drive means, wherein said coupling means includes a contact roller for contacting a roller that forms a portion of said draw means, and for contacting a roller that forms a portion of said drive means.

9. A method of loading imageable media into an imaging system, said method comprising the steps of:

positioning a cassette containing a web of imageable media in the imaging system;

driving a feed roller in the imaging system, said motion of said feed roller causing a supply roller in said cassette to move said media toward said feed roller at least until said media contacts said drive roller.

10. The method as claimed in claim 9, wherein said step of driving said feed roller in said imaging system includes the step of rotating a contact roller that is coupled to each of said feed roller and said supply roller.

* * * * *